United States Patent [19]
Eckstein

[11] 3,917,388
[45] Nov. 4, 1975

[54] LENS SYSTEM

[75] Inventor: Victor Eckstein, Sydney, Australia

[73] Assignee: Ringprism Pty. Limited, Sydney, Australia

[22] Filed: Sept. 26, 1973

[21] Appl. No.: 400,865

[30] Foreign Application Priority Data
Oct. 4, 1972  Australia.............................. 686/72
Oct. 4, 1972  Australia.............................. 72/687

[52] U.S. Cl. ............................................. 352/113
[51] Int. Cl.² ......................................... G03B 41/04
[58] Field of Search ........... 352/105, 113, 116, 117, 352/118, 119; 350/6

[56] References Cited
UNITED STATES PATENTS
| | | | |
|---|---|---|---|
| 1,647,631 | 11/1927 | Ives | 350/6 X |
| 2,464,139 | 3/1949 | Luboshez | 352/116 |
| 2,769,367 | 11/1956 | Schweisinger | 352/116 |
| 2,975,668 | 3/1961 | Eckel | 350/6 |
| 3,720,459 | 3/1973 | Bach | 352/116 X |

FOREIGN PATENTS OR APPLICATIONS
| | | | |
|---|---|---|---|
| 982,400 | 1/1951 | France | 352/118 |
| 443,071 | 5/1926 | Germany | 352/117 |

Primary Examiner—Samuel S. Matthews
Assistant Examiner—Alan Mathews
Attorney, Agent, or Firm—Browne, Beveridge, DeGrandi & Kline

[57] ABSTRACT

A film projector in which light from a light source is transmitted through a gate across which the film is fed. The light is directed through a ring prism comprising two coaxial contra-rotatable prism elements which are rotated in synchronism with the movement of the film. The radially outer surface of the outer prism element and the radially inner surface of the inner prism element are cylindrical. The light is directed through the prism elements in their radially inwards direction and a director element is disposed inside the ring prism to direct the beam of light from the projector. A positionally adjustable magnifying element is disposed between the gate and the ring prism to vary the apparent size of the film frame. A cyclically operating beam sweep element is disposed intermediate the light source and the gate to cause the light falling on any part of the film to illuminate that part alone during its passage across the gate opening.

9 Claims, 19 Drawing Figures

LENS SYSTEM

This invention relates to cinematographic film projectors and in particular to projectors of the "shutterless" type in which the film is fed at constant velocity across a gate in front of a light source and in which the beam of light transmitted through the film is intercepted by a moving optical element synchronised with the film and serving to continuously redirect the beam of light in a manner producing a substantially stationery image on the viewing screen not withstanding the movement of the film. Such optical elements are frequently referred to as leveling elements.

Conventionally the said moving element comprises a ring prism, that is to say an annular wedge-sectioned ring of glass or other transparent material. The prism angle varies continuously around the ring from a maximum in one sense to zero and then to an equal maximum in the opposite sense. The two maxima are thus adjacent at this point there is an abrupt transition from one to the other.

The ring prism is rotated about its axis and is a light beam infringing radially on the ring at a fixed position is cyclically re-directed so as to scan regularly in one direction with a virtually instantaneous return to a starting direction when the discontinuity in the ring prism arrives at the beam.

Unlike more conventional projectors, in which the film moves intermittently and in which a shutter interrupts the light beam while the film is in motion, shutterless projectors have a gate opening equal in length to two frames of the film instead of one and the ring prism is rotated such that when a particular frame has its trailing edge at one edge of the gate opening the beam of light is diverted to a maximum extent in one direction, and when that frame is centrally positioned in the gate opening, the ring prism having rotated through 180°, there is no diversion, and when the leading edge of that frame arrives at the opposite edge of the gate opening the diversion is a maximum in the other direction. The varying angular diversion of the beam serves to maintain a constant output direction notwithstanding the motion of the film.

In a fairly recent development of the shutterless projectors the single ring prism previously used is replaced by two contra-rotating prism elements co-axially disposed one within the other.

The expedient eliminated aberrations produced by the change in prism angle in the length of prism intercepting the light beam at any instant but nevertheless detrimental spherical and chromatic aberrations remained; so much so that notwithstanding the inherent simplicity of design and flexibility in operation of shutterless projectors they have not as yet wide spread acceptance.

The disadvantages referred to comprise:

a. turbidity in the projected image due to dispersion as the light beam enters and leaves the ring prism.

b. spherical and chromatic aberrations produced by the ring prism c. a tendency for cyclic brightness variations in the projected image due to different intensities of illumination at different parts of the gate.

d. difficulty in maintaining exact correspondence between the edges of the film frame appearing at the gate and the positioning of the discontinuity in the ring prism because of stretching or contracting of the film with age.

An object of the present invention is to provide a shutterless projector which overcomes or at least ameliorates disadvantages (a) and (b) above and which in its preferred forms also overcomes or at least ameliorates disadvantages (c) and (d).

In prior known projectors the contra-rotating ring prism elements had a constant gap between them, that is to say the radially inner surface of the outer prism element and the radially outer surface of the inner prism element were right cylindrical surfaces and the variation in prism angle was produced by variations of the inclination of the radially inner surface of the inner prism element and radially outer surface of the outer prism element respectively.

By comparison in projectors according to the invention the reverse arrangement is utilised, it being the radially outer surface of the outer prism element and the radially inner surface of the inner prism element which are cylindrical and it being the radially inner surface of the outer prism element and the radially outer surface of the inner prism element which are inclined. This enables the light beam entering and leaving the prism to do so substantially normally to the prism surface so reducing dispersion and turbidity in the final image.

The above-mentioned improvement largely overcomes disability (a), and disability (b) is largely overcome by reorganising the array of optical elements in the light path to enable the cross-sectional dimensions of the light beam where it travels through the prism to be smaller than has been the case previously so enabling a smaller prism to be used and rendering the optical parameters of the prism less critical.

Hitherto the arrangement has been to project the beam of light transmitted from the film through a focussing system along a path parallel to the axis of rotation of the ring prism to a mirror or stationary prism inside the ring prism serving to bend the beam through 90° and project it radially outwardly through the ring prism.

According to the invention however that arrangement is modified by beaming the light from the film through the focussing system and then immediately through the prism from the outside in a radially inwards direction perpendicular to the axis of rotation and then deflecting it towards the screen by way of a fixed mirror or prism disposed within the ring prism. Thus the length of the diverging light beam emerging from the focussing system to the ring prism is reduced and its cross-section smaller at the prism.

According to preferred embodiments of the invention disability (d) is overcome by introducing a simple positionally adjustable magnifying element between the gate and the ring prism to enable the apparent size of the film frame to be varied to compensate for shrinkage or extension of the film.

Disability (c) is overcome in accordance with preferred embodiments of the invention by the insertion of a cyclically operating beam sweep element intermediate the light source and the film gate. This element may be a disc-like prism operating in synchronism with the film and causes the light falling on any part of the film to be directed to illuminate that part alone during its full passage across the gate opening so that for the whole time that that particular film part is being projected it is illuminated from the same source. This direction of the light from the light source falling on the film is by no means as critical as the operation of the ring prism itself. Indeed instead of a device causing a stepless variation in the light direction the beam sweep element may be a simple element having 8or more discontinuities causing a corresponding number of abrupt changes in light direction during the passage of a frame across the gate opening.

The beam sweep element is preferably combined with a re-directing element to maintain the direction of the beam towards the optical centre of the focussing system.

Thus, in one of its aspects the invention consists in a film projector comprising a light source, a gate defining a gate opening having a length at least equal to that of two frames of the film to be projected, means to feed the film across the gate opening at a substantially constant speed, a ring prism comprising two co-axial contra-rotatable prism elements, means to rotate said prism elements in synchronism with the motion of the film, a focussing lens system positioned so as to receive light transmitted through the film in the gate and to direct it through the prism elements in their radially inwards direction and a fixed director element disposed inside the ring prism to direct the beam of light from the projector.

According to another aspect of the invention it consists in a ring prism comprising two co-axial contra-rotatable elements characterised in that the radially outer surface of the outer element and the radially inner surface of the inner element are cylindrical surfaces.

According to a preferred embodiment of the invention, a ring prism according to the second-mentioned aspect of the invention, is used as the levelling element in a projector according to the first-mentioned aspect of the invention.

Furthermore, for preference, the projector includes a position adjustable magnifying element disposed to intercept the light beam between the gate opening and the focussing lens system and a fixed reducing element disposed to intercept the light beam between the focussing lens system and the ring prism.

Also, for preference, the projector includes a movable beam sweep element intercepting the light path between the source and the gate, driven in synchronism with the film and causing the light impinging on any portion of the film to be diverted to maintain substantially constant illumination of that portion during its passage across the gate opening.

By way of example, several embodiments of the invention are described hereinafter with reference to the accompanying drawings.

FIGS. 1 (a), (b) and (c) illustrate diagrammatically the operation of the ring prism according to the invention in a projector according to the invention.

Figure 1:
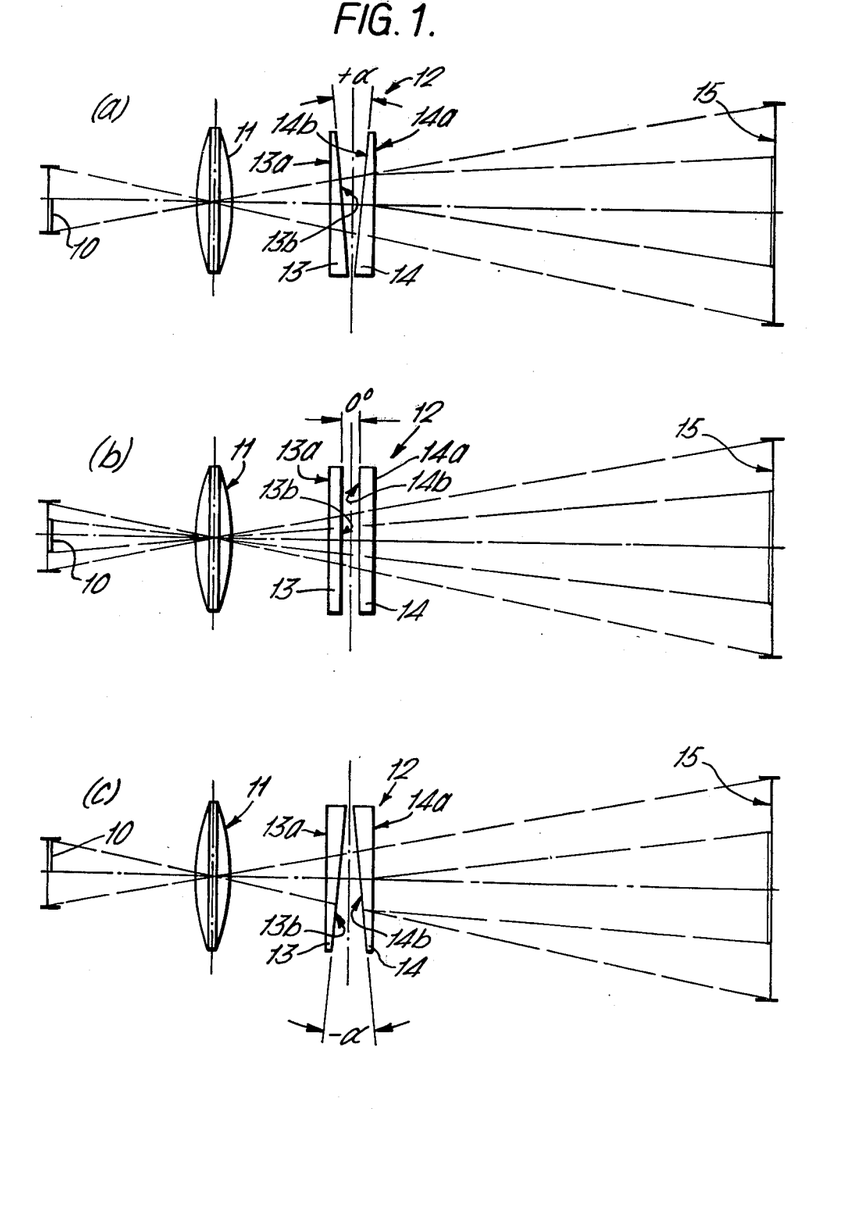

Referring initially to FIG. 1, which illustrates the principle of operations of the ring prism, the sections (a), (b) and (c) of that figure show the light paths relative to a single frame 10 as it travels across the illuminated gate opening. The light rays are shown as emerging from the leading and trailing edges of the frame. Having travelled through the film the rays are directed by a focussing element 11 through a ring prism 12 comprising two contra-rotating annular prism elements 13 and 14 (shown in cross-section in FIG. 1) and are diverted by the prism to a fixed directing element (not shown) to a screen 15.

In FIG. 1(a) the trailing edge of the frame 10 has just entered the gate opening and the two prism elements 13 and 14 are disposed with their discontinuities just to one side of the light beam so that the maximum positive prism angle $\alpha$ is effective and the light beam is deflected so that the image falls on the centre of the screen 15.

FIG. 1(b) shows a later stage in which the frame 10 has progressed to the middle of the gate opening and the prism elements have rotated through 180° so that the prism angle is zero. Thus, the picture is projected without deflection and the image, once again, falls on the centre of the screen 15.

FIG. 1(c) shows the situation as the leading edge of the frame 10 reaches the opposite edge of the gate opening. At this time, the discontinuity in the prism elements is just to the other side of the beam so that the maximum negative prism angle of $\alpha$ is effective to deflect the beam in the opposite sense to bring the image to the centre of the screen 15 once more.

It will be seen from FIG. 1 that the radially outer surface 13(a) of the outer prism element 13 and the radially inner surface 14(a) of the inner prism element 14 are right cylindrical surfaces and that it is the mutually adjacent surfaces 13(b) and 14(b) respectively of which the inclination varies.

Figure 11:
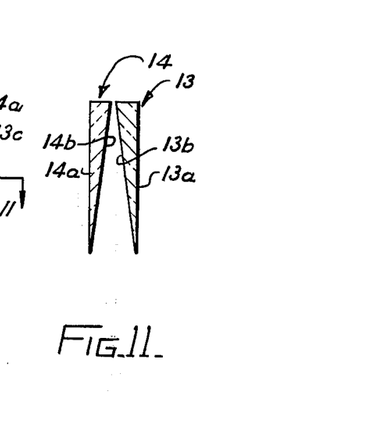
FIGS. 11, 13, 15, 17 and 19 are cross-sectional views of the prisms at section planes 11, 13, 15, 17 and 19 of FIGS. 10, 12, 14, 16 and 18 respectively.
Figure 12:
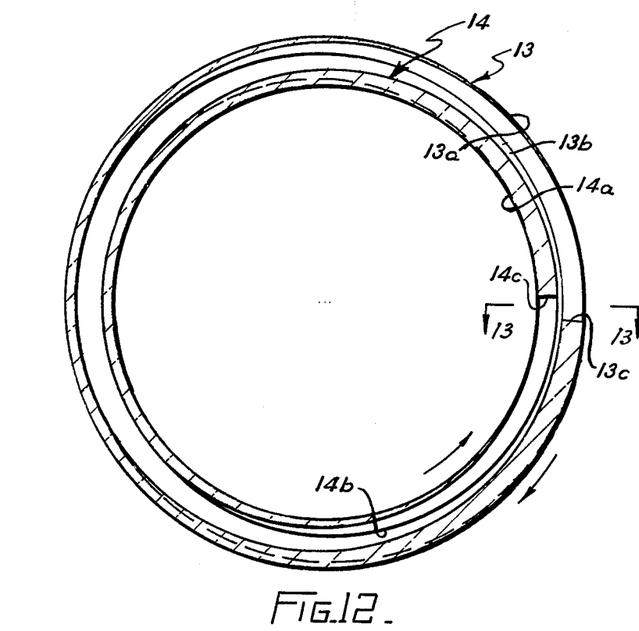
Figure 13:
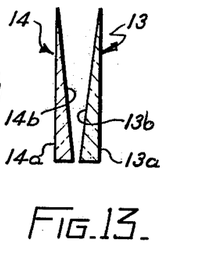

For further clarity the contra-rotating ring prisms are shown in front elevation in FIGS. 10, 12, 14, 16 and 18 in various stages of relative rotation. Adjacent to each of these figures is a cross-sectional view of the prism taken at section lines 11, 13, 15, 17 and 19 respectively. Outside prism 13 has an exterior right cylindrical surface 13a and inside prism 14 has an inside right cylindrical surface 14a. The inside surface of prism 13, 13b and the outside surface of prism 14, 14b vary in inclination around their peripheries. Each of these surfaces has a discontinuity, which are denoted as 13c and 14c respectively and as shown in FIG. 11, surface 13b has a near maximum inclination in one direction just at one side of its discontinuity and surface 14b has a near maximum inclination in the same direction just on the other side of its discontinuity. At the discontinuity the inclination changes from a maximum in one direction to a maximum in the other direction. This is shown in FIG. 13 which shows the prisms after the discontinuities have rotated to a point just past the section plane, and thus FIG. 13 is a sectional view just on the opposite side of both discontinuities than the sides through which the section of FIG. 11 is taken.

Figures 14, 15:
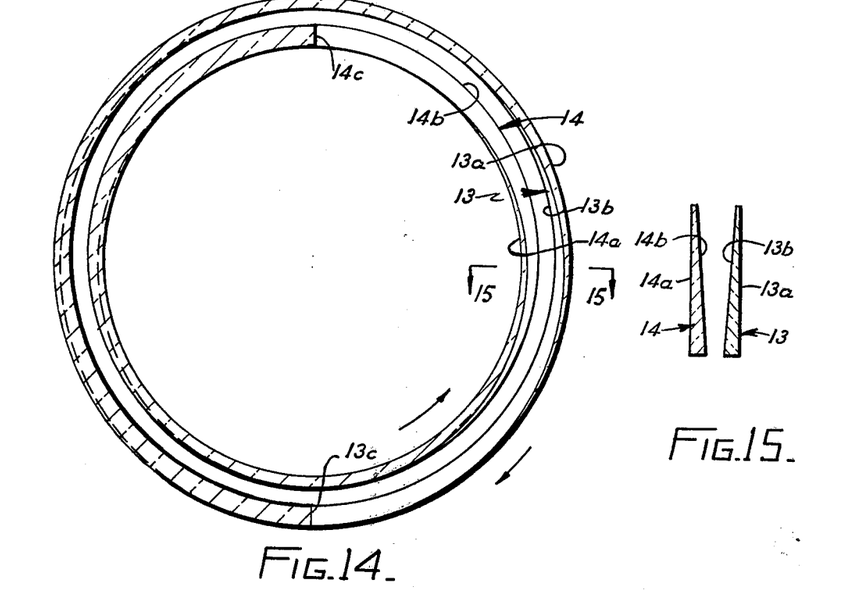
Figure 16:
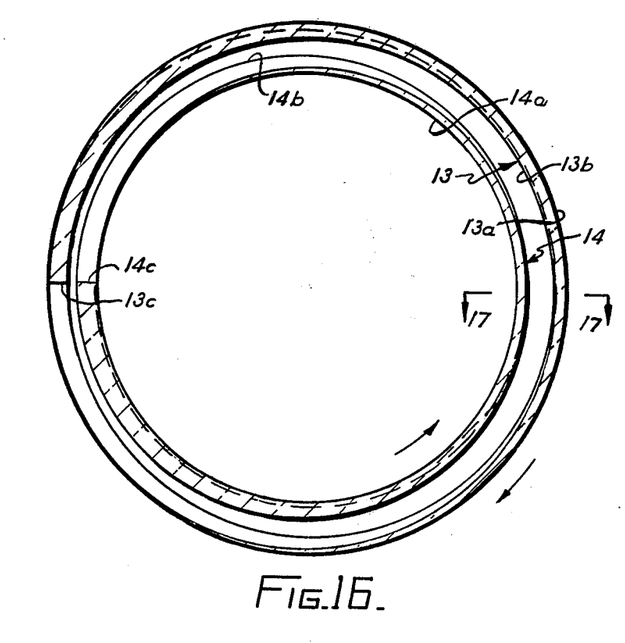
Figure 17:
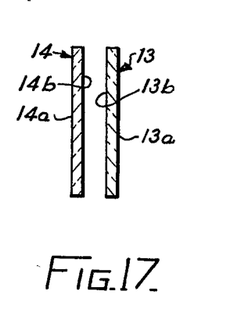
Figure 18:
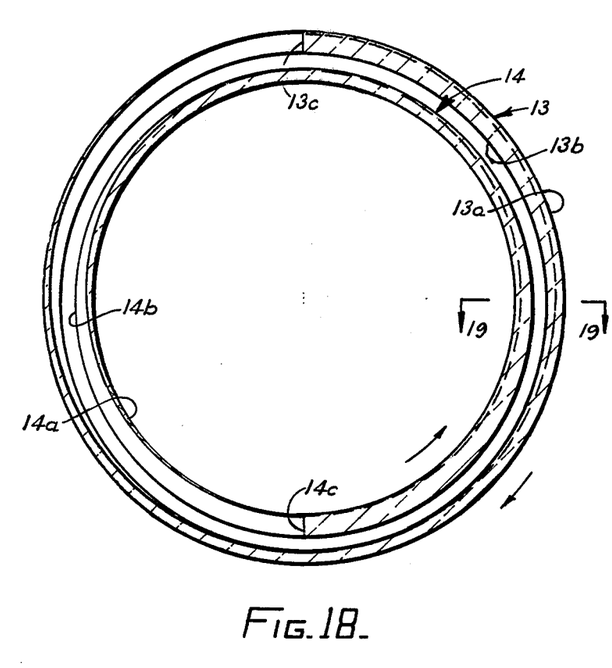
Figure 19:
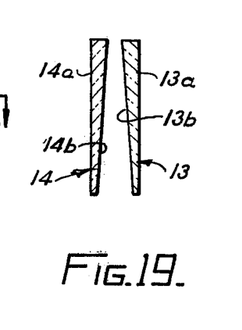

The prism angle varies continuously from a maximum in one direction to zero half way around the prism to a maximum in the other direction 360° around the prism. FIG. 16 shows the prism elements with their discontinuities diametrically opposite to the section plane and it is seen from FIG. 17 that the prism angle is zero. FIGS. 14 and 18 show the prism elements at positions intermediate to positions discussed above and FIGS. 15 and 19 show the corresponding sections at the section plane.

A prism, according to prism 12 described above, is included in the embodiment of the invention illustrated by FIGS. 2 to 5 and to avoid the need for further description the same reference numerals are used in relation to the prism as have been used in FIG. 1.

Figure 2:
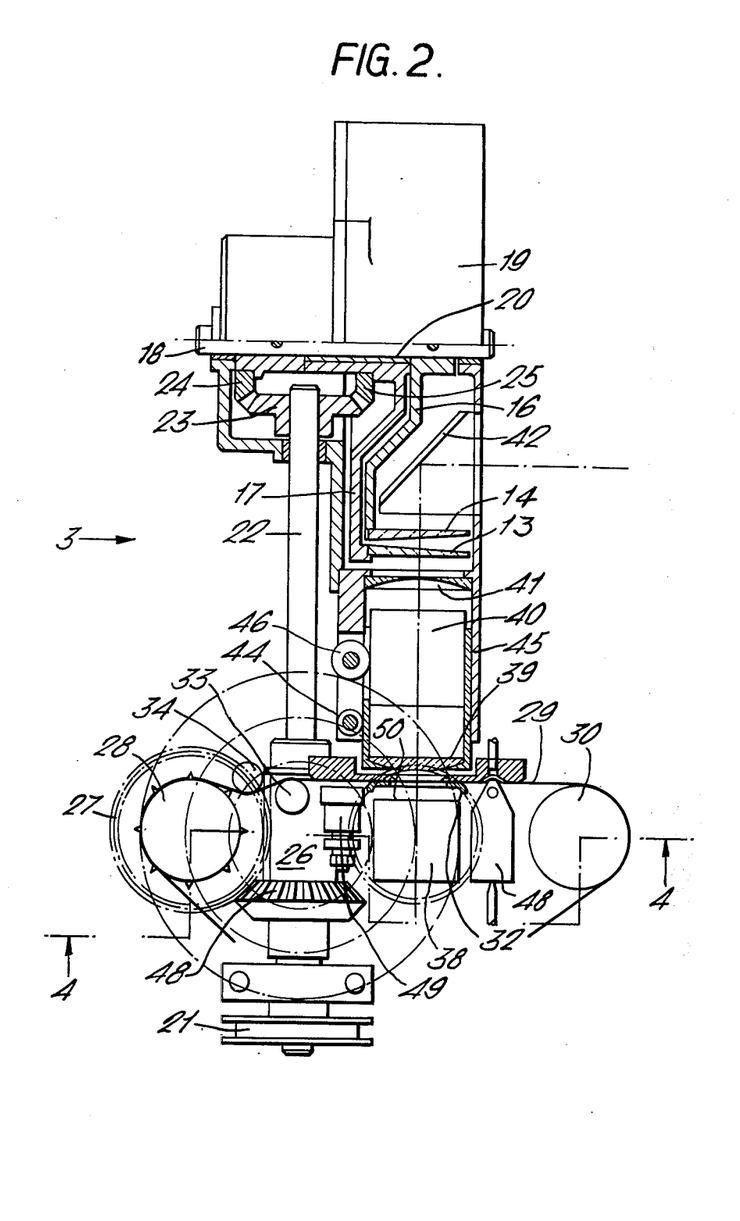
FIG. 2 is a plan view of the operating mechanism and optical elements of a film projector according to the invention.
Figure 3:
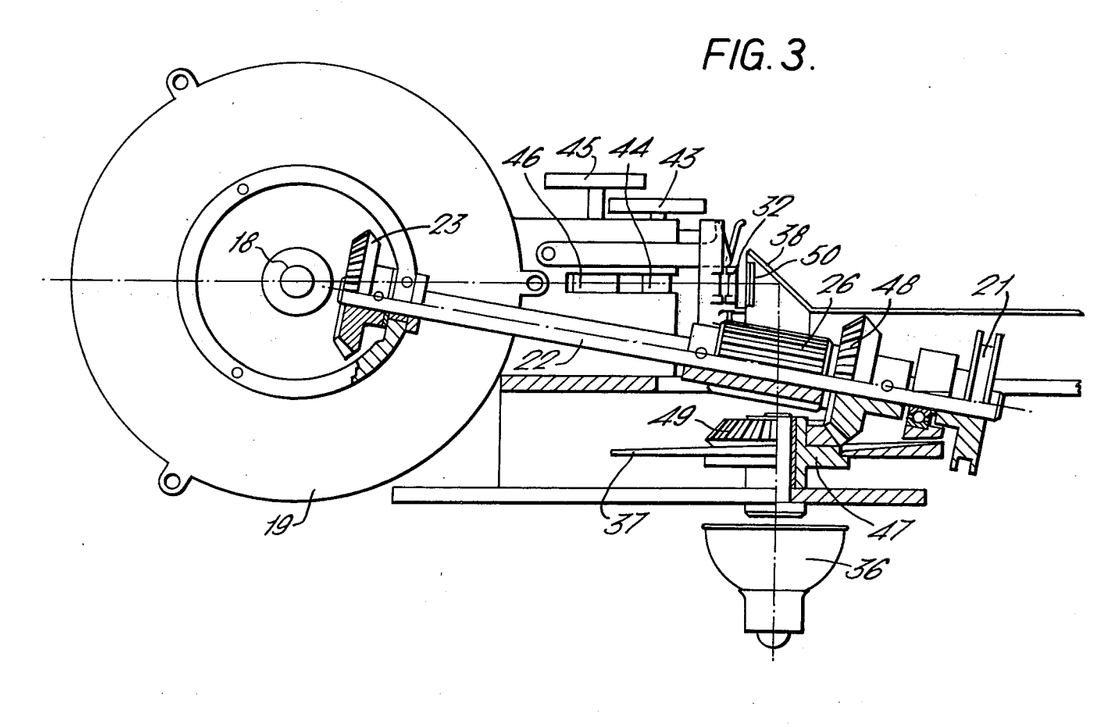
FIG. 3 is a partly sectional side elevation of the apparatus of FIG. 2 as seen in the direction of arrow 3 in that Figure.
Figure 4:
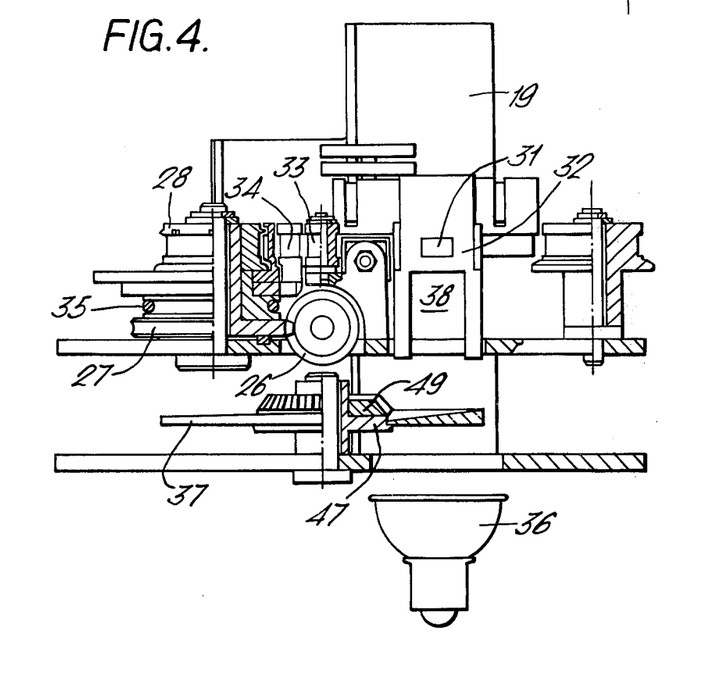
FIG. 4 is a partly sectional front elevation of the apparatus of FIG. 2 taken approximately on line 4—4 of that figure.

The prism elements 13 and 14 are mounted as rims on prism carrier wheels 16 and 17 respectively. The carrier wheel 16 is fixed to a wheel shaft 18 mounted for rotation in the apparatus casing 19 whilst carrier wheel 17 is free to rotate upon a sleeve 20 on shaft 18.

The apparatus is driven by way of a motor (not shown) drive connected to a driven pulley 21 on a main shaft 22 and a bevel gear 23 on the shaft 22 meshes with ring gears 24 (fixed to shaft 18) and 25 (fixed to carrier wheel 17) respectively. Thus, the two carrier wheels 16 and 17 are rotated in opposite directions so causing the prism elements 13 and 14 to rotate in opposite directions. Near its other end the main shaft 22 supports a worm 26 in mesh with a wheel 27 fixed to a toothed film driving sprocket 28 of a conventional kind.

The driving sprocket 28 advances film 29 from a delivery spool (not shown) around an idler pulley 30 across a gate opening 31 in a more or less conventional gate 32, between two jockey rollers 33 and 34 respectively to a take-up spool (not shown) driven by way of a rubber drive belt 35 trained around a wheel fixed to the sprocket 28. Thus, the movement of the film and the rotation of the ring prism elements, being derived from the same main shaft 22, are synchronised.

The precise position of the film frames relative to the gate may be adjusted by lateral movement of the jockey roller 34 to alter the length of film between the gate opening and the sprocket 28. This enables the frame edges to be set in correct relationship to the ring prism discontinuity as explained earlier with reference to FIG. 1.

Figure 5:
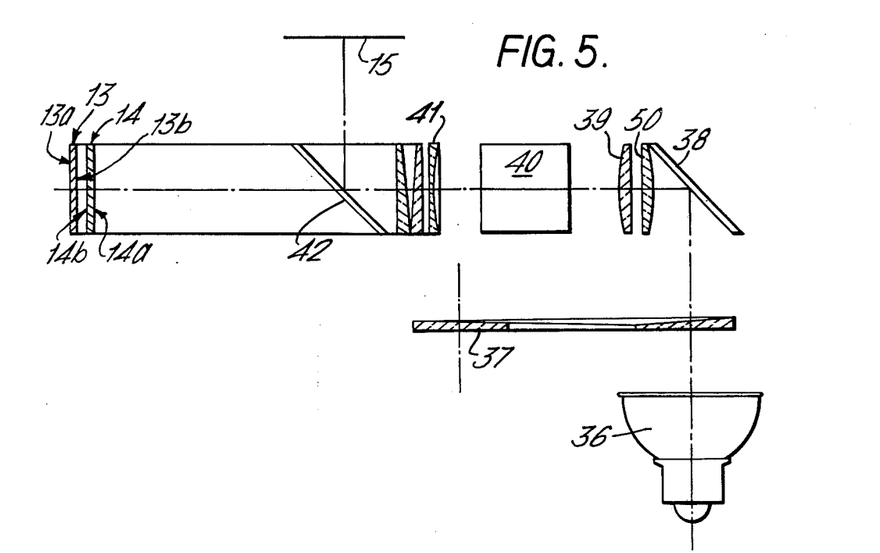
FIG. 5 is a diagrammatic view of the optical elements of the apparatus of FIG. 2.

The light source in the form of a conventional lamp 36 is mounted so as to direct a beam of light through a beam sweep element 37, to be described in more detail hereinafter, on to a mirror 38 and, thence through a re-directing cylindrical element 50 and the gate opening 31, a magnifying lens 39, a focussing lens system 40 of conventional kind, a reducing element 41, the prism elements 13 and 14 on to a deflecting mirror 42 and thence, to the screen 15.

In other embodiments of the invention the deflecting mirror 42 is replaced by a right angle prism deflecting the light beam by virtue of total internal reflection.

To assist in preventing dispersion, it is desirable for the reducing element to conform closely with the adjacent surface of the prism element 13.

The magnifying element 39 may be moved towards and away from the gate opening 31 by rotation of a thumbwheel 43 on a shaft carrying a friction roller 44 in contact with a tubular carrier 45 for the element 39.

Likewise, the focussing lens system 40 may be moved by similar arrangements comprising a thumbwheel 45 and a friction roller 46. Thus, the effective size of the film frame may be adjusted to compensate for stretching or contraction of the film by manipulation of the thumbwheel 43; following which, sharp focussing of the image may be achieved by manipulation of the thumbwheel 45.

The beam sweep element 37 is a single-piece disc-like prism mounted for rotation upon a hub 47 driven by way of a bevel gear 48 on the main shaft 22 meshing with a driven gear 49 on the hub 47. One of its faces is planar and the other is of continuously varying inclination. It serves to sweep the light beam from the lamp 36 cyclically and in synchronism with the film 29 so that the beam, in effect, follows the movement of the film.

The cylindrical element 50 re-directs the moving beam to correct the angular displacement introduced by the beam sweep element 37.

Figure 6:
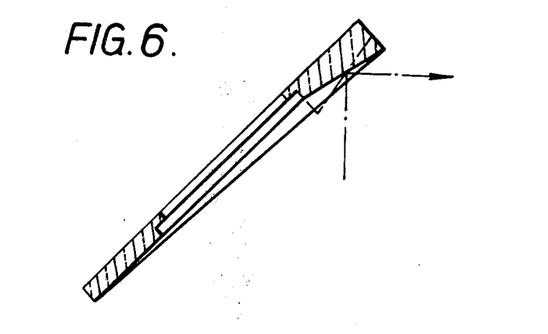
FIGS. 6 to 9 respectively are diagrammatic cross-sectional views of beam sweep elements of other embodiments of the invention.

FIGS. 6 to 9 respectively illustrate other beam sweep elements which may be utilised to replace element 37. FIG. 6 is, in effect, a ring mirror of which the reflecting face varies in its angle of inclination around the circumference of the ring as indicated by the full and dotted lines in FIG. 6.

Figure 7:
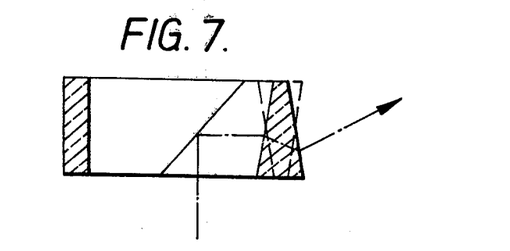

FIG. 7 illustrates a single ring prism of which the prism angle varies from a maximum in one sense to zero to an equal maximum in the opposite sense in association with a fixed mirror.

Figure 8:
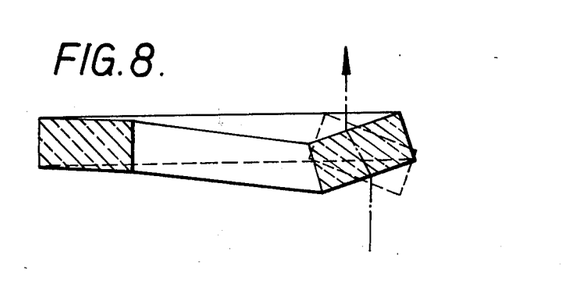
Figure 9:
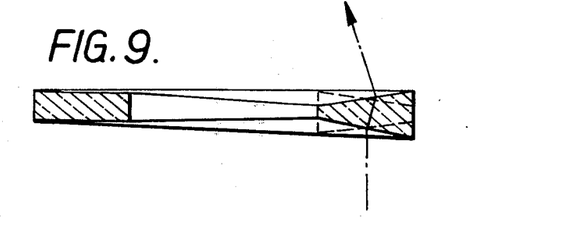
Figure 10:
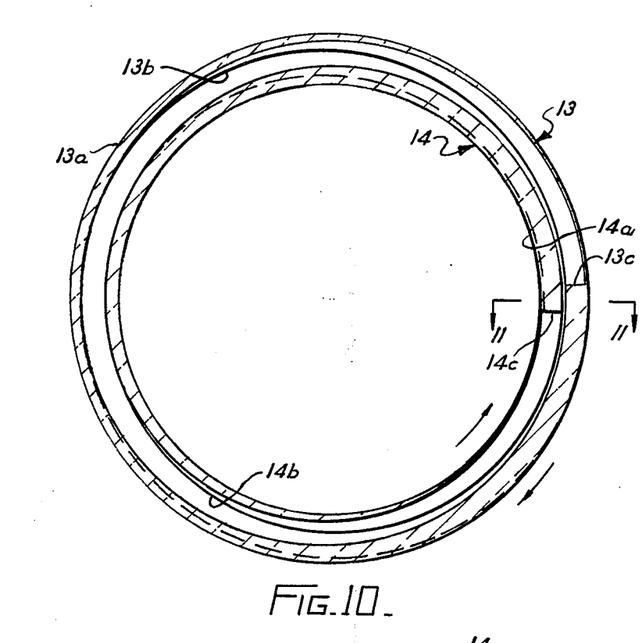
FIGS. 10, 12, 14, 16 and 18 are front elevational views of the contra-rotating ring prisms at various stages of rotation.

FIG. 8 illustrates a ring of rectangular section of which the inclination of the longitudinal axis of its cross-section varies in a similar manner, and FIG. 9 illustrates a ring prism similar to element 37 except that both its faces are inclined.

The illustrates projector may be furnished with a magnetic sound transducer 48, an optical sound transducer 49 or both of conventional kinds.

I claim:

1. A film projector comprising a light source, a gate defining a gate opening having a length at least equal to that of two frames of the film to be projected, means to feed the film across the gate opening at a substantially constant speed, means for projecting light from said light source through said film at said gate opening, a ring prism comprising two concentric annular contra-rotatable ring prism elements, each element having a radially inner surface and a radially outer surface, one of said radially inner and said radially outer surfaces for each element being a right cylindrical surface and the other surface being disposed at an angle which varies around the circumference of the element, means to rotate said prism elements in opposite directions in synchronism with the motion of the film, lens means for directing the light beam which passes through said film towards said ring prism so that the beam travels through both ring prism elements in the radially inwards direction, and a fixed director element located within the volume which is bounded by the radially inner surface of the inside ring prism element for directing the beam of light from the projector.

2. A film projector according to claim 1 wherein said lens means for directing comprises a focusing lens system, further including a position adjustable magnifying element disposed to intercept the light beam between the gate opening and the focusing lens system.

3. A projector according to claim 2 including a fixed reducing element disposed to intercept the light beam between the focussing lens system and the ring prism.

4. A projector according to claim 3 wherein said fixed reducing element has a spherical concave surface adjacent to the focussing lens system and a part-cylindrical surface adjacent to the ring prism and substantially co-axial therewith.

5. A projector according to claim 1, including a moveable beam sweep element intercepting the light path between the source and the gate, means driving said beam sweep element in synchronism with the film to cause the light impinging on any portion of the film to be diverted to maintain a substantially constant illumination of that portion during its passage across the gate opening.

6. A projector according to claim 1 wherein the synchronisation of the prism elements and the film is effected by way of a motor driven main shaft having a bevel gear on it meshing with bevel wheels in fixed relationship with the prism elements respectively and a worm on the main shaft in mesh with a worm wheel in fixed relationship to a toothed film driving sprocket.

7. A projector according to claim 6 wherein said ring prism has a discontinuity where the prism angle changes from a maximum in one direction to a maximum in the other direction, further including means for altering the length of film between the gate opening and the driving sprocket whereby the frame edges of the film may be set in correct relationship to the ring prism discontinuity.

8. A projector according to claim 7 wherein said means for altering comprise a laterally moveable jockey roller running against the moving film.

9. A shutterless film projector comprising a light source, a gate defining a gate opening having a length at least equal to that of two frames of the film to be projected, means to feed the film across the gate opening at a substantially constant speed, means for projecting light from said light source through said film at said gate opening, an optical leveling element comprising a rotatable ring prism which comprises two annular concentric contra-rotatable ring prism elements, each element having a radially inner surface and a radially outer surface, the radially outer surface of the outer ring prism element and the radially inner surface of the inner ring prism element being right cylindrical surfaces and the radially inner surface of the outer ring prism element and the radially outer surface of the inner ring prism element being disposed at an angle which varies around the circumference of the elements, lens means for directing the light beam which passes through said film towards said prism substantially normally to said outer surface of said outer ring prism element so that the beam travels through both elements in their radially inwards direction, and means located within the volume bounded by the radially inner surface of the inside ring prism element for directing the beam of light from said ring prism and said projector.

* * * * *